United States Patent [19]

Burkes et al.

[11] Patent Number: 5,401,524

[45] Date of Patent: Mar. 28, 1995

[54] STORAGE STABLE CALCIUM-SUPPLEMENTED BEVERAGE PREMIX CONCENTRATES AND SYRUPS

[75] Inventors: Alice L. Burkes; George M. Fieler; William J. Gore; Maria E. Zuniga; Jeffrey L. Butterbaugh, all of Cincinnati, Ohio

[73] Assignee: The Proctor & Gamble Company, Cincinnati, Ohio

[21] Appl. No.: 138,938

[22] Filed: Oct. 19, 1993

Related U.S. Application Data

[63] Continuation of Ser. No. 964,238, Oct. 21, 1992, abandoned.

[51] Int. Cl.$^6$ .......................... A23L 1/304; A23L 2/02
[52] U.S. Cl. ........................ 426/590; 426/74; 426/599; 426/654
[58] Field of Search ................ 426/74, 590, 599, 654

[56] References Cited

U.S. PATENT DOCUMENTS

| | | | |
|---|---|---|---|
| 4,551,342 | 11/1985 | Nakel et al. | 426/548 |
| 4,722,847 | 2/1988 | Heckert | 426/74 |
| 4,737,375 | 4/1988 | Nakel et al. | 426/590 |
| 4,830,862 | 5/1989 | Braun et al. | 426/74 |
| 4,867,977 | 9/1989 | Gailly et al. | 424/687 |
| 4,871,554 | 10/1989 | Kalala et al. | 426/74 |
| 4,919,963 | 4/1990 | Heckert | 426/599 |
| 4,992,282 | 2/1991 | Mehansho et al. | 426/72 |
| 4,994,283 | 2/1991 | Mehansho et al. | 426/74 |
| 5,028,446 | 7/1991 | Saleeb et al. | 426/590 |
| 5,118,513 | 6/1992 | Mehansho et al. | 426/2 |
| 7,814,030 | 12/1991 | Zuniga et al. | . |
| 7,964,239 | 10/1992 | Burkes et al. | . |
| 7,964,314 | 10/1992 | Burkes et al. | . |
| 7,964,316 | 10/1992 | Andon | . |

FOREIGN PATENT DOCUMENTS 0227174 1/1987 European Pat. Off. ........ A23L 2/02

(List continued on next page.)

OTHER PUBLICATIONS

Johnston, Jr. et al., "Calcium Supplementation and Increase in Bone Mineral Density in Children", N. Eng. J. Med., 327:82–87, Jul. 9, 1992.

Dawson-Hughes et al., "A Controled Trial of the Effect of Calcium Supplementation in Bone Density in Postmenopausal Women", N. Eng. J. Med. 323(13):878–881, Sep. 27, 1990.

(List continued on next page.)

Primary Examiner—Helen Pratt
Attorney, Agent, or Firm—Rose A. Dabek; J. C. Rasser

[57] ABSTRACT

This invention relates to storage stable beverage premix concentrates for preparing syrups, beverages and food compositions which are nutritionally supplemented with significant levels of calcium and to a method for preparing these concentrates. Further, this application relates to beverage flavor base compositions for preparing said beverage premix concentrates and to a method for preparing the beverage flavor base compositions. The beverage concentrates have a greater than 10 fold concentration and comprise:

(a) from about 1.2% to about 7%, by weight, solubilized calcium;

(b) from about 4.8% to about 47%, by weight, of an edible acid component comprising a mixture of citric acid and malic acid wherein the ratio of citric and malic equivalents to calcium equivalents is from about 1.5:1 to about 2:1 and the ratio of citric acid to malic acid equivalents is from about 3:97 to about 93:7;

(c) from about 0% to about 4%, by weight, of an acidic anion component selected from the group consisting of chloride anion, nitrate anion, sulfate ion and mixtures thereof;

(d) an effective amount of a flavor component; and (e) from about 5% to about 70% sugar, on a dry weight basis;

(f) from about 8% to about 40%, by weight, water;

wherein the weight ratio of said acid component to said solubilized calcium is from about 4 to about 7 and said beverage concentrate has a pH of less than or equal to about 4.5, preferably less than or equal to about 3.5. These beverage concentrates are stable at temperatures of greater than about 85° F. (29° C.), preferably 90° F. (32° C.), for at least about 4 hours, preferably at least about 3 days.

9 Claims, No Drawings

FOREIGN PATENT DOCUMENTS

| | | | |
|---|---|---|---|
| 0244903 | 11/1987 | European Pat. Off. | A23L 2/38 |
| 0301653 | 2/1989 | European Pat. Off. | A23L 2/26 |
| 304986 | 3/1989 | European Pat. Off. | A61K 31/91 |
| 304987 | 3/1989 | European Pat. Off. | A23L 1/19 |
| 346866 | 12/1989 | European Pat. Off. | A23L 1/304 |
| 0470259 | 2/1991 | European Pat. Off. | A23L 2/00 |
| 56-097248 | 8/1981 | Japan | C07C 51/41 |
| 2207335 | 2/1989 | United Kingdom | A23L 2/00 |
| WO-A-8909604 | 10/1989 | WIPO | A61K 33/32 |
| WO91/19692 | 12/1991 | WIPO | C07C 59/265 |

OTHER PUBLICATIONS

Bishop, "Calcium Slows Bone Loss for Women Past Menopause, Experiment Shows", Wall Street Journal, Sep. 27, 1990.

Unknown, "Calcium Prevents Bone Loss in Postmenopausal Women", Tufts University Press Release (Boston, Mass., Sep. 1990).

Hudepohl et al., "Effects of Sugar Alcohols on Calcium Bioavailability from Fruit Juices", Presentation given Apr. 1990.

Mehansho et al., "Calcium Bioavailability and Iron—Calcium Interaction in Orange Juice", J. of the Amer. College of Nutr., 8(1):61–68, 1989.

Holbrook et al., "Dietary Fructose or Starch: Effects on Copper, Zinc, Iron, Manganese, Calcium, and Magnesium Balances in Humans", Am J Clin Nutr. 49:1290–4, 1989.

Riis et al., "Does Calcium Supplementation Prevent Postmenopausal Bone Loss?" N. Eng. J. of Med. 316(4):174–177, Jan. 22, 1987.

Nilas et al., "Calcium Supplementation and Postmenopausal Bone Loss", Brit. Med. J. 289:1103–6, Oct. 27, 1984.

STORAGE STABLE CALCIUM-SUPPLEMENTED BEVERAGE PREMIX CONCENTRATES AND SYRUPS

This is a continuation of application Ser. No. 07/964,238, filed Oct. 21, 1992, now abandoned.

TECHNICAL FIELD

The present invention relates to storage stable beverage premix concentrates and beverage syrups used for preparing beverages and food compositions which are nutritionally supplemented with significant levels of calcium. The present invention particularly relates to beverage premix concentrates and syrups which provide for excellent stability at high temperatures and to a method for preparing these concentrates.

BACKGROUND OF THE INVENTION

Dietary calcium inadequacy may be a contributing cause to osteoporosis for some populations. For example, a positive correlation between calcium intake and bone mass has been found across many age groups. It has been suggested that the level of calcium intake early in life directly influences the peak bone mass achieved at skeletal maturity.

Calcium can be obtained from a variety of dietary sources. Primary sources of calcium are dairy products, in particular milk, which account for 75% of the daily calcium intake while foods other than dairy products generally contribute less than 200 mg of calcium daily. However, beginning in young adulthood and continuing through later life, the general population may not consume milk in sufficient quantities to obtain needed levels of calcium. This diminished consumption can be caused by lactose intolerance as well as by the unattractiveness of milk as a drink for social occasions.

To achieve a greater consumption of calcium throughout life, more appealing alternatives to milk are needed. Such beverages must be consumed in sufficient quantities to provide nutritionally beneficial amounts of calcium. Therefore, non-dairy product beverages which comprise a milk level of calcium, 0.12% by weight, are in demand. To this end, soft drinks and fruit juice products have been devised which are fortified with calcium.

In order to save on shipping, packaging costs, and storage space, beverage premix concentrates and syrups are preferred by beverage manufacturers and bottlers. Further, bottlers, manufacturers and dispensing systems of soft drinks typically use beverage premix concentrates or beverage syrups in their processing. However, as these premixes and syrups become more concentrated, the water level decreases making it difficult to solubilize solids, such as sugars. The decreased water level, for the same reason, makes fortification with calcium extremely difficult.

Generally, beverage premix concentrates used to prepare beverages, in particularly ones containing juice, require special attention with stock rotation and storage temperatures to prevent spoiling and separation and sedimentation of suspended or solubilized solids, particularly for calcium solids. Due to the level of calcium in the premix concentrate necessary to achieve a nutritionally significant level of calcium in the finished product, the precipitation of insoluble calcium salts, particularly at high temperatures is a significant problem. Stability at high temperatures, greater than about 85° F. (29° C.), preferably greater than about 90° F. (32° C.), is particularly important for unrefrigerated storage, storage in warehouses without climate control, particularly in tropical and sub-tropical environs, and for storage near heat sources such as those found in commercial kitchens.

Another concern in developing a calcium supplemented single strength beverage is achieving a balanced blend of flavor and clean mouth feel without lingering flavor or unpleasant aftertaste. The inclusion of high levels of calcium can impart significant "chalky" and/or "biting/burning" mouthfeel sensations. Also, the inclusion of chloride ion can impart a salty and/or bitter note to the flavor. In addition to providing consumer acceptable taste, the beverage needs to be visually appealing to the consumer. The inclusion of significant levels of insoluble calcium often produces a cloudy, opaque beverage with sediment. All of these concerns are further complicated by the low level of solubilizing water and high solids content in beverage premix concentrates and syrups.

It is the object of the present invention to provide beverage premix concentrates and beverage syrups which are nutritionally supplemented with up to about 60 times milk level calcium, typically from about 10 times to about 58 times milk level calcium, and are stable i.e., free from calcium precipitates or sugar crystals, at high temperatures, greater than about 85° F. (29° C.) and preferably greater than about 90° F. (32° C.). It is another object that single strength beverages prepared from the premix concentrates or syrups have consumer acceptable taste and mouthfeel as well as provide visual appeal.

SUMMARY OF THE INVENTION

The premix concentrates of the present invention are nutritionally supplemented with up to 60 times milk level calcium, typically from about 10 times to about 58 times milk level calcium, and single strength beverages prepared from these concentrates provide significant levels of nutritionally beneficial calcium. In addition, the premix concentrates or beverage syrups possess significant stability from calcium salt precipitation at high temperatures while single strength beverages prepared from the premix concentrates or beverage syrups are generally stable from calcium precipitation possess an acceptable taste and mouthfeel. The greater than 10 fold beverage premix concentrates comprise:

(a) from about 1.2% to about 7%, by weight, solubilized calcium;

(b) from about 4.8% to about 47%, by weight, of an edible acid component comprising a mixture of citric acid and malic acid wherein the ratio of citric and malic equivalents to calcium equivalents is from about 1.5:1 to about 2:1, preferably from 1.5:1 to 1.8:1, and the ratio citric to malic equivalents is from about 3:97 to about 93:7, preferably from about 10:90 to about 50:50 and more preferably about 20:80;

(c) an effective amount of a flavor component;

(d) from about 5% to about 70% sugar, on a dry weight basis; and (e) from about 8% to about 40%, by weight, water; wherein the weight ratio of said acid component to said solubilized calcium is from about 4 to about 7 and said beverage premix concentrate has a pH of less than or equal to about 4.5, preferably less than or equal to about 3.5. These beverage premix concentrates are stable at temperatures of greater than at least about 85° F. (29° C.) and preferably at least about 90° F. (32° C.) for at least about 4 hours. From 0% to about 30% of the soluble calcium can be sourced from an acidic calcium salt. The compositions can additionally comprise from 0% to about 4% and preferably from about 0.2% to about 1.7% of an acidic anion which results in increased stability of greater than about 3 days at temperatures of at least about 85° F. (29° C.) and preferably greater than 7 days at temperatures of at least about 85° F. (29° C.).

Preferred beverage premix concentrates of the present invention are stable from calcium precipitation for at least about 3 days, preferably at least 7 days, at temperatures of at least about 85° F. (29° C.) and comprise:

(a) from about 1.7% to about 3.3% by weight solubilized calcium;

(b) from about 8% to about 22%, by weight, of an edible acid component comprising a mixture of citric acid and malic acid wherein the ratio of citric and malic equivalents to calcium equivalents is from about 1.5:1 to about 1.8:1 and the ratio of citric acid to malic acid equivalents is from about 3:97 to about 93:7;

(c) from about 0.2% to about 1.7%, by weight, of an acidic anion preferably selected from the group consisting of chloride anion, nitrate anion, sulfate anion and mixtures thereof;

(d) an effective amount of a flavor component;

(e) from about 35% to about 70% sugar, on a dry weight basis, wherein at least about 60% of said sugar is fructose; and (f) from about 25% to about 35%, by weight, water; wherein the weight ratio of said edible acid component to said solubilized calcium is from about 5.5:1 to about 6.5:1 and said beverage premix concentrate has a pH preferably less than or equal to about 4.5. From about 0% to about 30% of the soluble calcium can be sourced from an acidic calcium salt. Preferably from about 10% to about 20% of the soluble calcium is sourced from an acidic calcium salt selected form the group comprising calcium chloride, calcium nitrate, calcium sulfate, and mixtures thereof. Typically, this provides from 0% to about 4%, preferably from about 0.2% to about 1.7% and most preferably from about 0.2% to about 1.3%, of an acidic anion such as chloride anion, nitrate anion, sulfate anion and mixtures thereof. Preferably, these preferred beverage premix concentrates provide from about 3% to about 12% fruit or botanical juice by volume when the beverage premix concentrate is diluted to a single strength beverage. The preferred beverage premix concentrates are generally stable from calcium precipitation for from about 3 days to about 50 days at temperatures of at least about 85° F. (29° C.). These preferred beverage premixes provide from about 14 times to about 28 times milk level calcium.

The most preferred beverage premix concentrates of the present invention provide for stability from calcium salt precipitation at temperatures of at least about 90° F. (32° C.) for at least about 3 days, preferably at least about 14 days and most preferably at least about 28 days and a soluble system, i.e., free from insoluble calcium or sugar solids. Such beverage premix concentrates comprise:

(a) from about 1.7% to about 2.5%, by weight, solubilized calcium;

(b) from about 8% to about 16%, by weight, of an edible acid component comprising a mixture of citric acid and malic acid wherein the ratio of citric and malic equivalents to calcium equivalents is from about 1.5:1 to about 2:1, preferably from 1.5 to about 1.8:1, and the ratio of citric equivalents to malic equivalents is about 3:97 to about 93:7, preferably from about 10:90 to about 50:50 and more preferably 20:80;

(c) from about 0.2% to about 1.3%, by weight, of an acidic anion;

(d) an effective amount of a flavor component;

(e) from about 45% to about 65%, sugar, on a dry weight basis, comprising at least about 60% fructose, on a dry weight basis; and (f) from about 25% to about 35%, by weight, water; wherein the weight ratio of said edible acid component to said solubilized calcium is from about 5.5:1 to about 6.5:1; the weight ratio of sugars (on a dry weight basis) to water is from about 1:1 to about 2:1, preferably from about 1.5:1 to about 2:1 and most preferably about 2:1; and said beverage premix concentrate has a pH of less than or equal to 4.5. Preferably, these compositions provide from about 3% to about 12% fruit or botanical juice by volume when the beverage premix concentrate is diluted to a single strength beverage.

The present invention further relates to a method for preparing calcium-supplemented beverage premix concentrates. The preferred method comprises preparation of a calcium fortified sweetener and a beverage flavor base composition, followed by their combination.

Definitions

"Beverage premix concentrate", as used herein, refers to a beverage premix to which sugars along with optionals such as preservatives are added (normally by bottlers/manufacturers) with the appropriate amount of water to form beverage syrups or drinkable single strength beverages. Beverage premix concentrates within the scope of the present invention are typically formulated to provide drinkable beverages when combined with from about 10% to about 14% manufacturer/bottler ingredients then diluted with from about 75% to about 85% water or from about 5 to about 7 parts by volume water.

"Manufacturer/bottler ingredients" refers to sugars, typically sucrose or fructose, and optional ingredients such as stabilizers; typically fiber and clouding agents, and vitamins such as Ascorbic Acid, Vitamin C, Vitamin E, and pro A.

"Syrups," as used herein, refers to a beverage product which when diluted with the appropriate amount of water forms a drinkable beverage. Syrups as described herein are prepared by the manufacturer/bottler at generally about 6× (six fold), more generally 4× to 8×, strength such that the syrup is diluted with 5 parts water by volume to form a single strength beverage. Most people are familiar with this syrup in relation to a dispenser that give beverages from mixtures of syrups and water such as at a convenience store.

"Beverage" or "single-strength beverage" as used herein refers to a beverage composition in a ready-to-serve, drinkable form. Beverages of the present invention typically comprise at about 80% water. Beverages contemplated within the scope of the present invention include both carbonated and noncarbonated forms.

"Water", as used herein, includes water from flavors, juice concentrates, sugar syrups and other sources, e.g., gum solutions. Water of hydration of calcium and other solids must be included.

"Solids", as used herein, are primarily the dissolved sugars, acids, calcium salts and flavor materials. Gums would also be included. Typically, solids are measured by the refractive index and are called °Brix. °Brig approximates the solids content of the concentrate.

"Sugars", as used herein, means a carbohydrate sweetener. Preferably these are monosaccharides and disaccharides. The sugar includes both liquid syrups and crystalline or solid sugars. Sugars are expressed on a dry weight basis, that is, a fructose syrup is described as having 77% solids of which 55% is fructose and 23% water. Thus, one hundred grams of this syrup would provide seventy seven grams of solids and twenty three grams of water.

"Comprising", as used herein, means various components can be conjointly employed in the beverage premix concentrates, beverage syrups, beverage flavor base compositions, beverages and food compositions of the present invention. Accordingly, the terms "consisting essentially of" and "consisting of" are embodied in the term comprising.

All percentages, ratios and proportions herein are by weight, unless otherwise specified.

DETAILED DESCRIPTION OF THE INVENTION

BEVERAGE PREMIX CONCENTRATES:

Calcium

The key nutritional component of the beverage premix concentrates of the present invention is calcium. Suitable sources of calcium include calcium carbonate, calcium oxide, calcium hydroxide, calcium sulfate, calcium chloride, calcium phosphate, calcium hydrogen phosphate and calcium dihydrogen phosphate, as well as the respective organic salts of calcium, e.g., calcium citrate, calcium malate, calcium tartrate or calcium lactate. Mixtures of calcium carbonate, calcium hydroxide, calcium chloride, calcium sulfate and calcium nitrate, are preferred calcium sources. Most preferred are calcium carbonate, calcium hydroxide and mixtures thereof.

To be useful in the present invention, the calcium needs to be "solubilized", i.e., dissolved, in the beverage, beverage syrup, fortified sugar syrup or beverage premix concentrate. Accordingly, the amount of calcium included in the beverage concentrates of the present invention will be referred to in terms of "solubilized calcium", [i.e., the amount of calcium ion dissolved]. For the beverage premix concentrates of the present invention, solubilized calcium is preferably sourced from calcium carbonate, calcium hydroxide, calcium chloride, calcium sulfate, calcium nitrate and mixtures thereof.

It has been found that from 0% to about 30% of the soluble calcium can be provided by an acidic calcium salt such as calcium chloride, calcium sulfate, calcium nitrate, calcium acetate and mixtures thereof. Although not an acidic calcium salt, calcium lactate can be used to provide from 0% to about 30% of the soluble calcium and it provides an effect similar to that produced by using an acidic calcium salt. Preferably, from about 10% to about 20% of the soluble calcium is sourced from an acidic calcium salt. Preferred acidic calcium salts for use herein are calcium chloride, calcium nitrate, calcium sulfate and mixtures thereof.

For single strength or the drinkable beverages made from the syrups of beverage premix concentrates of the present invention, calcium is preferably present in an amount of at least about 0.04% by weight. This minimum level of calcium (about ⅓ milk level) provides significant nutritional supplementation. Preferably the maximum level of calcium on a single strength basis is up to about 0.15% by weight for fruit and botanical juice beverages and typically about the same for other beverages. Preferably, the level of calcium in fruit and botanical juice beverages is from about 0.8% to about 0.15% by weight, which includes milk level, i.e., about 0.12% by weight.

The beverage premix concentrates of the present invention comprise from about 1.2% to about 7% solubilized calcium. Preferably, the beverage premix concentrates comprise from about 1.7% to about 3.3%, more preferably from about 1.7% to about 2.5%, solubilized calcium.

Acid Component

A key component for the beverage premix concentrates from the standpoint of stability against precipitation of insoluble calcium salts and for taste, mouthfeel quality and desirable onset of sourness, is the edible acid component. The edible acid component comprises a mixture of citric acid and malic acid.

The mixture of citric acid and malic acid of the present invention has citric and malic equivalents to calcium equivalents from about 1.5:1 to about 2:1. The preferred ratio of citric to malic equivalents is from about 3:97 to about 93:7, preferably from 10:90 to about 50:50 and most preferably about 20:80. These acids can be present as acids or else as their respective anionic salts, i.e., citrate and malate.

It is important to this invention that the calcium source be completely neutralized by the citric and malic acids and that the equivalents from the acids be in excess of the equivalents from the calcium source. The product herein must have an excess of citric and malic equivalents. Preferably, there is at least about 50%, preferably at least about 80%, more acid equivalents from citric and malic acid than calcium. This can be defined by the following equation: Cit+Mal=x (Ca) where x=from about 1.5 to about 1.8; Cit=equivalents of citric acid; Mal=equivalents of malic acid and Ca=equivalents of calcium. In general, it has been found that a weight ratio of acid to calcium of from about 4 to about 7, preferably from about 5.5 to about 6.5, accomplishes this result.

For the beverage premix concentrate of the present invention, the level of the edible acid component can range from about 4.8% to about 47%, and preferably from about 8% to about 22%. The most preferred level of the edible acid component is from about 8% to about 16%.

Acidic Anion Component: Chloride, Nitrate and Sulfate

Beverage premix concentrates can comprise, and preferred beverage premix compositions do comprise, from 0% to about 5% of acidic anions, preferably chloride anion, nitrate anion, sulfate anion, acetate anion and mixtures thereof. Although not an acidic anion, it has been discovered that from 0% to about 4% of lactate anion can also be used to provide an effect similar to that provided by an acidic anion. The lactate anion can be obtained from its corresponding acid form or preferably from its corresponding calcium salt, calcium lactate. Mixtures of anions are preferred when utilizing acetate and/or lactate anions since the acetate and/or lactate anions can introduce off-flavors.

Preferably, the level for the preferred acidic anions, i.e., chloride anion, nitrate anion, sulfate anion and mixtures thereof, is in the range of from about 0.2% to about 1.7%. More preferably, the level is from about 0.2% to about 1.3%. These ranges are based on the weight of the anion and not on the salt. That is, the weight of the cation is ignored.

The chloride, nitrate and sulfate anions are preferably obtained from their corresponding acid forms, i.e., hydrochloric acid and nitric acid, or from their corresponding calcium salts such as calcium nitrate, calcium sulfate or calcium chloride. Other (cations) salts such as the corresponding sodium, potassium, magnesium, or zinc salts can be used herein.

Mixtures of chloride anion with other suitable anions, such as nitrate and sulfate, are preferred. Due to the solubility of sulfate, mixtures of sulfate anions with other suitable anions is required.

Preferably, the chloride anion is derived from calcium chloride, which can preferably provide from 0% to about 2.1% solubilized calcium. More preferably, calcium chloride provides from about 0.1% to about 1% solubilized calcium and most preferably from about 0.1% to about 0.8%. Calcium chloride, calcium nitrate and calcium sulfate combined can supply from about 0% to about 30% of the solubilized calcium for concentrates. Preferably, calcium chloride, calcium nitrate and calcium sulfate combined supply from about 10% to about 20% of the solubilized calcium present in concentrates. Preferably, the remaining calcium, in the range of 80% to 90%, comes from calcium carbonate or calcium hydroxide most preferably calcium carbonate. These sources have the advantage of being neutralized by the acids and thus contribute no anion off-flavor.

The use of chloride, nitrate, sulfate, acetate and lactate anions in the beverage premix concentrates of the present invention contributes to the stability at high temperatures when using high levels of solubilized calcium, i.e., greater than about 1.2% solubilized calcium. This is especially true when the acidic anions are used in combination with fructose.

Flavor Component

The particular amount of the flavor component effective for imparting flavor characteristics to the beverage premix concentrates can depend upon the flavor(s) selected, the flavor impression desired and the form of the flavor component. The flavor component of the present invention is preferably selected from the group consisting of fruit flavors, botanical flavors, fruit juices, botanical juices and mixtures thereof.

Any water in the flavorant is included in the water level given for the beverage premix concentrate. In addition, any sugars in the flavorant are accounted for in the sugar level given for the beverage concentrate on a dry weight basis. Further, the acids, such as malic acid and citric acid, contributed by the flavorant are included in the calculations for the levels given for total acids and the ratio of citric to malic acids given for the beverage premix concentrates.

The flavor component usually comprises from about 0.01% to about 10% of the beverage premix concentrates of the present invention. When single strength fruit juice is used as the flavor, the additional flavorants can be added at levels of from about 2.2% to about 3%, preferably from about 1.7% to about 2.2%, of the beverage premix concentrate. The amount of juice used as the flavorant depends on the amount of sugar and water present and is easily determined by one skilled in the art.

The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are apple flavors, pineapple flavors, grape flavors, and cherry flavors. Citrus flavors including orange flavors, lemon flavors, lime flavors and grapefruit flavors can be used. These fruit flavors can be derived from natural sources such as fruit juices, fruit concentrates, fruit purees and flavor oils, or else synthetically prepared.

The term "botanical flavor(s)" refers to flavors derived from parts of a plant other than the fruit; i.e., derived from beans, nuts, bark, roots and leaves. Also included within the term "botanical flavor" are synthetically prepared flavors made to simulate botanical flavors derived from natural sources. Examples of botanical flavors include cocoa, chocolate, vanilla, coffee, cola, tea and the like. Botanical flavors can be derived from natural sources such as essential oils and extracts, or can be synthetically prepared.

The term "fruit juice(s)" refers to citrus juices and non-citrus juices. Examples are as apple juice, grape juice, pear juice, nectarine juice, currant juice, raspberry juice, orange juice, grapefruit juice, gooseberry juice, blackberry juice, blueberry juice, strawberry juice, custard-apple juice, cocoa juice, pomegranate juice, guava juice, kiwi juice, lemon juice, lime juice, mango juice, papaya juice, watermelon juice, cantaloupe juice, cherry juice, cranberry juice, pineapple juice, peach juice, apricot juice, plum juice, prune juice, passion fruit juice, tamarindo juice, banana juice and mixtures thereof. Preferred juices are apple, pineapple, grape, cherry and mixtures thereof. In addition to fruit juices any botanical juice may be used as all or part of the flavor component of the present invention.

The term "botanical juice(s)" refers to juices derived from parts of a plant other than the fruit, e.g., derived from stems, beans, nuts, bark, roots and leaves. Botanical juices particularly suitable for making the beverage concentrates of the present invention include tomato juice, lettuce juice, celery juice, spinach juice, cabbage juice, watercress juice, dandelion juice, rhubarb juice, carrot juice, beet juice and cucumber juice.

The use of a low citric acid containing flavorant is preferred because of the low level of citric acid used in the total system for preferred stability. Preferably when utilizing chloride anions and especially when using calcium chloride, it is preferred for the flavorant to have a high malic acid content.

For use in the flavorant of the present invention, the fruit and botanical juices are typically and preferably concentrated by conventional means. Fruit juices are typically concentrated from about 20° Brix to about 80 °Brix.

The juices can be concentrated by evaporation. Conventional evaporators of the ascending or descending film type, evaporators combining the ascending and descending film feature, multiple tube evaporators, plate type evaporators, expanding flow evaporators and centrifuged evaporators can be used and are preferred.

Other means of concentrating juice can be used. These would include reverse osmosis, sublimation concentration, freeze drying or freeze concentration. Economically, however, it is preferred to use an evaporation technique.

Sugar

The term "sugar" includes all carbohydrates or sugars, for example, monosaccharides and disaccharides, such as glucose, sucrose, maltose, liquid sucrose, fructose, low molecular weight dextrins and related carbohydrates. "Sugar" also includes liquid fructose, high fructose corn syrup, invert sugar, maltose syrup, corn syrup and sugar alcohols, including sorbitol and mixtures thereof. Artificial or high intensity sweeteners are not encompassed by the term sugar, but they can be present in the composition as a means of enhancing the beverage taste or flavor.

The level of sugar on a dry weight basis used in the beverage premix concentrates ranges from about 5% to about 70%, preferably from about 35% to about 70%, and most preferably from about 45% to about 65%. Preferred sugars for use in the present invention are fructose, glucose, maltose, sucrose, invert sugar and mixtures thereof. The more preferred sugars are fructose, glucose, sucrose and mixtures thereof. It should be noted that sugars, especially high fructose corn syrup, have been found to enhance the absorbability/bioavailability of calcium from beverages made from the beverage premix concentrates of the present invention.

Generally, fructose is used in the form of liquid fructose, high fructose corn syrup, or dry fructose. Preferably, the high fructose corn syrup (on a solids basis) comprises 71% solids, at least about 42% of the solids are fructose. Preferred fructose sources are syrups containing from about 42% to about 55% fructose and liquid fructose (99% fructose solids) available from A. E. Staley Manufacturing, Decatur, Ill.

Other natural or artificial sweeteners can be optionally used. Artificial sweeteners include saccharin, cyclamates, acesulfam-K, L-aspartyl-L-phenylalanine lower alkyl ester sweeteners (e.g., aspartame), L-aspartyl-D-alanine amides disclosed in U.S. Pat. No. 4,411,925 to Brennan et al., issued Oct. 23, 1983, L-aspartyl-D-serine amides disclosed in U.S. Pat. No. 4,399,163 at Brennan et al., issued Aug. 16, 1983, L-aspartyl-L-1-hydroxymethyl-alkane- amide sweeteners disclosed in U.S. Pat. No. 4,338,346 to Brand, issued Dec. 21, 1982, L-aspartyl-1 -hydroxyethyl-alkaneamide sweeteners disclosed in U.S. Pat. No. 4,423,029 to Rizzi, issued Dec. 27, 1983, L-aspartyl-D-phenylglycine ester and amide sweeteners disclosed in European patent application 168,112 to J. M. Janusz, published Jan. 15, 1986, and the like.

Because of the acidity of the beverage premix concentrate systems of the present invention and due to temperatures above about 90° F. (32 °C.), L-aspartyl-L-phenylalanine lower alkyl ester sweeteners, such as aspartame, may degrade and therefore are not preferred for use in the present compositions. Thus, low-calorie sweetener combinations containing a noncaloric sweetener such as aspartame and a sugar, can be used in beverage premix concentrates, however, they are not preferred due to the stability problems of the artificial sweeteners.

The amount of the sweetener effective in the beverage premix concentrates and food compositions of the present invention depends upon the particular sweetener used and the sweetness intensity desired. For mixtures of noncaloric sweeteners and sugars, the amount of non-caloric sweetener varies depending upon the sweetness intensity of the particular sweetener. In determining the amount (dry weight basis) of sugar, any sugar or other sweetener present in the flavorant, typically from the use of juices, is included in the level of sugar for the beverage premix concentrate.

Concentration

The beverage premix concentrates of the present invention when diluted with manufacturers ingredients produce syrups which are about 6-fold. Typically, the concentration is greater than 4-fold and preferably greater than 5-fold. This means that for a 6-fold product, 5 equal portions of water are used to make a single strength beverage.

Water

"Water" includes all the water contributed by the flavor, sugar and other components. At these high concentrations, the amount of water present will range from about 8% to about 40%, preferably from about 25% to about 35%.

Preferably, the weight ratio of sugars (on a dry weight basis) to water is from about 1:5 to about 3:1, preferably from about 1:1 to about 2:1, more preferably from about 1.5:1 to about 2:1 and most preferably about 2:1.

pH

The beverage premix concentrates have a pH of less than or equal to about 4.5. Preferably, the pH is less than or equal to about 4 and more preferably less than or equal to about 3.5.

Optional Ingredients

The beverage concentrates of the present invention may comprise any other ingredient or ingredients typically used as optional ingredients. Other minor beverage ingredients are frequently included. Such ingredients include preservatives such as benzoic acid and salts thereof, sulphur dioxide, etc. However, the amount of water and solids (e.g. sugar) and the pH of the present compositions typically provides microbial stability. Also, typically included are colors derived either from natural sources or synthetically prepared. See L. F. Green, *Developments in Soft Drinks Technology*, Vol. 1 (Applied Science Publishers Ltd. 1978), pp. 185-186 (herein incorporated by reference) for preservatives and colors used in beverages.

Gums, emulsifiers and oils can be included to change the texture and opacity of the beverage. Typical ingredients include guar gum, xanthan, alginates, mono and diglycerides, lecithin, pectin, pulp, cottonseed oil, vegetable oil and weighting oils. Esters and other flavor and essence oils can also be used.

Uses

The present beverage premix concentrates and syrups can be used as a sweetener and/or flavorant in food compositions in addition to making single strength carbonated and non-carbonated beverages.

Food compositions of the present invention can contain from about 0.1% to about 99% of the beverage concentrates. Preferred embodiments of these food compositions include baked goods, fruit drinks/mixes, frozen foods, candies, milk drinks/mixes, gelatins, puddings, fillings, breakfast cereals, breakfast bars, sauces, jams, jellies, whipped toppings, tablets, syrups, orally administered medicines, spreads, chewing gums and chocolates. The most preferred food compositions are confectionary products such as candy bars and gums.

The beverage premix concentrates and syrups of the present invention can be substituted for all or part of the sugars in a food composition. Just as adjustments are made in recipes and formulations for the different properties of sucrose and fructose or dextrose, adjustments for the different properties of these sugar derivatives must be made. These changes are within the skill of one in the art.

The following is by way of example a partial list of food compositions which can be made with these sugar derivatives: cakes, cookies, brownies, other sweet snacks, icings, frostings, pie fillings, puddings, creams, hard and soft candies, chocolates, crackers, snacks made from potatoes, corn, wheat and other grains, sauces, gravies, yogurt, ice cream, jellies, jams, breadings, breads, rolls, muffins, doughnuts and sweet rolls.

Method of Preparation of Beverage Premix Concentrates

In order to achieve the requisite stability from calcium precipitates, and sugar crystallization, materials must be added in a particular sequence. Further, to make a concentrated solution which is free from solids, all solids have to be dissolved in liquid media, e.g. water, juice, or high fructose corn syrup, either as a premix or during addition.

There are two basic methods for preparing the beverage premix concentrates of the present invention. The first method is typically referred to in the art as "continuous" or in-line preparation. The ingredients (water, acids, calcium source, and sugars) are constantly metered together to form the premix solution. Ingredients are metered and adjusted as necessary to insure appropriate solubilization of the calcium and to provide appropriate acidity. The second method is typically referred to as a "batch" preparation. The preferred method of preparation for the beverage premix concentrates is batch preparation.

For continuous preparation the beverage premix concentrate ingredients preferably should be divided as follows:
1. Sugars;
2. Organic acids: citric acid and malic acid;
3. Fruit or Botanical concentrates and purees;
4. Acidic Anion Sources: Calcium Chloride, Calcium Sulfate etc;
5. Reacting calcium sources: e.g., calcium hydroxide and calcium carbonate;
6. Water;
7. Flavorant, e.g., liquid alcohols; and
8. Optional ingredients: gums, preservatives, colors etc.

Ingredients 1, 2, 4, 5 and 6 are metered together to form a premix solution. Note that the reacting calcium sources (5) do not necessarily need to be slurried. They can be added as dry powder and mixed in-line with a high shear mixer if needed. The citric and malic acids in solution are analyzed for determination of the citric to malic ratio and adjustments are made by the addition of citric acid and/or malic acid as needed to achieve the necessary ratio.

The fruit and/or botanical concentrates and purees containing flavors (3) and optional ingredients (8) are analyzed for citric acid and malic acid content. The weight ratio of citric to malic acid is preferably adjusted to be the same weight ratio as the organic acid in (2). Additional citric and/or malic acid is added if necessary to achieve this ratio. The additional acids are preferably added to the organic acids of (2); however, they can be dissolved in the fruit or botanical concentrates and purees (3) as a premix. Otherwise, calcium citrate or calcium malate can form during the processing step and precipitate. Once precipitated, it is difficult to redissolve the solids in the limited water available. The solution containing the fruit and/or botanical concentrates and the premix containing the calcium are mixed together with their proportions controlled by logical systems to generate the complete beverage premix concentrate.

The preferred method of preparation of the beverage concentrates is through a batch process. Two premixes are prepared.

The first premix being a calcium fortified sugar syrup with a bioavailable source of calcium which is storage stable for at least about 4 hours, preferable at least about 7 days and most preferably at least about 21 days at temperatures of at least about 85° F. (29° C.), and is a clear pumpable solution.

Premix 1: Calcium Fortified Sugar Syrup

The calcium fortified sugar syrup is made from:
1. Water;
2. Citric Acid;
3. Malic Acid;
4. Sugar, preferably Liquid Fructose, High Fructose Corn Syrup and mixtures thereof;
5. Calcium Source, e.g. $CaCO_3$; and
6. Optionally on Acidic Anion Source, e.g. $CaCl_2$.

Stability from calcium precipitation and sugar crystallization over time and at high temperatures allows premix 1, calcium fortified sugar syrup compositions, to be stored for periods of time without refrigeration, dilution or freezing. Calcium fortified sugar syrup compositions of the present invention comprise:

a) from about 0.6% to about 7%, by weight, soluble calcium;

b) from about 2% to about 47%, by weight, of an edible acid component comprising a mixture of citric acid and malic acid wherein the ratio of citric and malic equivalents to calcium equivalents is from about 1.5:1 to about 2:1, preferably from 1.5:1 to about 1.8:1, and the ratio of citric to malic equivalents is from about 3:97 to about 93:7, preferably from about 10:90 to about 50:50 and more preferably about 20:80;

c) from about 5% to about 80%, preferably from about 5% to about 75% and more preferably from about 25% to about 55%, on a dry weight basis, sugar, wherein preferably at least about 15% of said sugar is fructose and the weight ratio of water to fructose (on a dry weight basis) is preferably from about 5:1 to about 1:3, more preferably from about 2:1 to about 1:2 and most preferably about 1:1 to about 1:2; and d) from about 5% to about 92% preferably from about 20% to about 70% and more preferably from about 23% to about 60%, by weight, water.

These compositions are stable from calcium precipitation for at least about four (4) hours to at least about 3 days at temperatures of at least about 85° F. (29° C.).

Particularly, the present invention relates to calcium fortified sugar syrup compositions which are stable from calcium precipitation and sugar crystallization for at least about three (3) days at temperatures of at least about 85° F. (29° C.) comprising:

a) from about 0.6% to about 2.5%, preferably from about 1.2% to about 2.4%, by weight, soluble calcium;

b) from about 2% to about 17%, preferably from about 4% to about 14%, by weight, of an edible acid component comprising a mixture of citric acid and malic acid wherein the ratio of citric and malic equivalents to calcium equivalents is from about 1.5:1 to about 2:1, preferably from 1.5:1 to about 1.8:1, and the ratio of citric equivalents to malic equivalents is from about 3:97 to about 93:7, preferably from about 10:90 to about 50:50 and more preferably about 20:80;
c) from about 5% to about 75% preferably from about 35% to about 70% and more preferably from about 30% to about 45%, on a dry weight basis, sugar wherein said sugar comprises at least about 5%, preferably at least about 15% and more preferably at least about 40%, fructose, on a dry weight basis; and
d) from about 5% to about 92%, preferably from about 11% to about 70% and more preferably from about 30% to about 60%, by weight, water.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). From about 3% to about 30% of the soluble calcium can be sourced from an acidic calcium salt. The compositions preferably can further comprise from about 0.05% to about 5%, preferably from about 0.2% to about 3%, of an acidic anion which typically improves stability by a factor of two. Another means of improving stability to at least about seven (7) days is for preferably at least about 15% and more preferably at least about 40% of the sugar to be fructose such that the weight ratio of water to fructose (on a dry weight basis) is from about 5:1 to about 1:3, preferably from about 2:1 to about 1:2 and most preferably from about 1:1 to about 1:2.

Further, the present invention relates to calcium fortified sugar syrup compositions which are stable from calcium precipitation and sugar crystallization for at least about 3 days, at temperatures of at least about 85° F. (29° C.) comprising:
a) from about 2.5% to about 7%, preferably from about 2.5% to about 5%, by weight, soluble calcium;
b) from about 10% to about 47%, preferably from about 15% to about 40%, by weight, of an edible acid component comprising a mixture of citric acid and malic acid wherein the ratio of citric and malic equivalents to calcium equivalents is from about 1.5:1 to about 2:1, preferably from 1.5:1 to about 1.8:1, and the ratio of citric to malic equivalents is from about 3:97 to about 93:7, preferably from about 10:90 to about 50:50 and more preferably about 20:80;
c) from about 10% to about 70%, preferably from about 25% to about 60% and more preferably from 30% to about 50% on a dry weight basis, sugar wherein said sugar comprises at least about 15%, preferably at least about 40%, fructose, on a dry weight basis; and
d) from about 20% to about 60%, preferably from about 25% to about 60%, by weight, water wherein the weight ratio of water to fructose (on a dry weight basis) ranges from about 5:1 to about 1:2, preferably from about 2:1 to about 1:2 and most preferably from about 1:1 to about 1:2.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). Preferably, these compositions are stable for at least about five (5) days at about 85° F. (29° C.).

From about 3% to about 30% of the soluble calcium can be sourced from an acidic calcium salt. The compositions preferably can further comprise from about 0.05% to about 5%, preferably from about 0.2% to about 4%, of an acidic anion which typically improves stability by a factor of two. The acidic anion is preferably selected from the group consisting of chloride anion, sulfate anion, nitrate anion and mixtures thereof.

Method of Preparation of Premix 1

The calcium salts react with the organic acids so the calcium is solubilized in the processing step. While not wishing to be bound by theory, it is believed that a metastable calcium citrate malate complex is formed. The calcium salts, e.g., calcium carbonate, along with the citric and malic acids remain in solution in the sweetener supplement compositions. When processed in the manner described herein, the calcium citrate malate is more soluble than the corresponding salts, i.e. calcium citrate and calcium malate.

In order to achieve the maximum stability benefit, the materials should be added in a particular sequence. When sugars and calcium salts are solubilized, they compete for water to remain in solution. To make a concentrated solution which is free from precipitates, all solids should be dissolved or slurried in liquid media, preferably in water or liquid fructose, either as a premix or during the addition step.

Several premixes or solutions are formed. The sugars are dissolved in water if a crystalline or solid form of sugar is being used. For ease of preparation, liquid sugars or syrups are most preferred for use. Preferred sugar sources are liquid fructose, invert syrup and high fructose corn syrup.

The citric and malic acids are also dissolved in water. Once the acids are dissolved, the acidic anion source or acidic calcium salts if utilized, e.g., calcium chloride, is then added with agitation until dissolved into the solution containing the citric and malic acids. The addition of an acidic anion source, e.g., calcium chloride, has two advantages, one being the pH of the solution is reduced making calcium solubility more favorable and the other being that greater stability from calcium salt precipitation at high temperatures is obtained. If used the preservatives and optional ingredients, i.e. thickeners, gums, alginates, pectins, emulsifiers are dissolved or slurried in liquid media to form a premix.

The sugar is then added to the acids in solution.

It is desirable that the calcium source be prepared as a slurry, however, it is not necessary. Thus the calcium source(s), e.g., calcium carbonate, is dispersed in water, liquid fructose, high fructose corn syrup or other sugar syrup. If utilized, the acidic calcium salts or acidic anion source, can be first dissolved in water by adding slowly with agitation; however, it is preferred that they be part of the citric and malic acids solution. The remaining calcium sources can then be slurried with water. Adequate agitation must be used to keep the slurry in suspension particularly when using calcium hydroxide which tends to form a paste in corners and dead spots.

To improve the stability of the calcium malate and especially the calcium citrate species, it is preferred to adjust the water to fructose (on a dry weight basis) weight ratio to range from about 1:1 to about 1:2. The addition of fructose reduces the water available for the formation of the insoluble calcium salts such as $Ca_3Cit_2 \cdot 4H_2O$. Without added fructose, the compositions are typically stable for at least about one week, after which the more insoluble $Ca_3Cit_2.4H_2O$ is formed. Hence for stability for greater than about one week a weight ratio of water to fructose (on a dry weight basis) of from about 2:1 to about 1:2 is preferred. Stability can be improved by adjusting the weight ratio of citric acid to malic acid in premix 1 or premix 2 such that they are equivalent before addition. Preferably, the weight ratio of citric acid to malic acid will range from about 20:80 to about 80:20 and more preferably about 26:74. In addition, stability can be improved by adjusting the weight ratio of sugars (on a dry weight basis) to water in premix 1 or premix 2 such that they are equivalent before addition. Preferably, the weight ratio of sugars (on a dry weight basis) to water will range from about 1:5 to about 3:1, preferably from 1:1 to about 2:1, more preferably from about 1.5:1 to about 2:1 and most preferably about 2:1.

One preferred mixing sequence is as follows:

The sugars and the acid solution are mixed with agitation to produce a uniform mixture. The addition sequence is not critical. The acids can be dissolved in the mix tank with water and the sugar solution pumped in, or the sugar solution can be put into the tank and the acid solution pumped in.

To this mixture is added the calcium slurry or dry calcium source. The addition is controlled so that the reaction mixture does not become too hot. The temperature should not exceed 120° F. (49° C.). Methods of keeping the temperature below 120° F. (49° C.) include using jacket cooling or recirculating the batch through a heat exchanger. The calcium source is neutralized by the citric and malic acids during this addition and excess acid is present. The temperature rises due to the heat of neutralization. When calcium carbonate is used, the neutralization produces carbon dioxide which can cause foaming. This can be controlled by the rate of addition of calcium carbonate.

Any preservatives, gums, emulsifiers, vitamins, minerals vegetable oils, weighting oils, or other similar optional ingredients can be added at this stage or to premix 2. These materials are added as a water solution or as liquids.

Another preferred mixing sequence is as follows:

The water and 30% of a High Fructose Corn Syrup (HFCS) is heated to 100° F. (38° C.). The acids are added to the solution and mixed with agitation until dissolved. High shear mixing, milling or dispersators can be used to provide sufficient mixing in low water systems. When an acidic calcium salt or calcium lactate is used, it is also dissolved in this solution.

The dry calcium source is dispersed in the remaining HFCS. When using calcium carbonate, the addition is controlled so that foaming caused by the neutralization product, carbon dioxide, is controlled. When calcium hydroxide is used, the neutralization process is an exothermic reaction. The addition is controlled so that the reaction mixture does not exceed 120° F. (49° C.).

Method of Preparation of Low Water Systems When Using High Fructose Corn Syrup or Liquid Fructose.

When preparing samples with a very low water content, less than or equal to about 20%, it is necessary to use as much as 70% of the Liquid Fructose, and/or high fructose corn syrup (HFCS). This will provide the water necessary to dissolve the acids. The water and 70% of the Liquid Fructose and/or High Fructose Corn Syrup, is heated to 100° F. (38° C.). The acids are added to the solution and mixed with agitation until dissolved. Dissolving the acids in water is endothermic causing the temperature to drop. Thus, additional heat may be needed to dissolve the acids. Continued heating may be necessary to dissolve the acids. Care is taken so that the temperature does not exceed 120° F. (49° C.). When acidic calcium salts, e.g. calcium chloride are used, they are also dissolved in this solution.

The dry calcium source is dispersed in the remaining sugar syrup. Calcium hydroxide is not preferred for use as the sole calcium source in this method. It tends to react with the high fructose corn syrup to form a solid mass. The addition is controlled so that foaming caused by the neutralization product, carbon dioxide, is controlled. At this point the composition is very viscous. Continued heating may be necessary. The addition is controlled so that reaction does not exceed 120° F. (49° C.).

Methods of Preparation of Low Water Systems When Using Fructose or Crystalline Sugars.

When preparing samples very low in water content, less than or equal to about 20%, it is necessary to use heat. The water is heated to 100° F. (38° C.). The acids are added to the solution and mixed with agitation until dissolved. The sugar is then added. Continued heating may be necessary to dissolve the sugars. Care is taken so that temperature does not exceed 120° F. (49° C.). When calcium chloride is used, it is also dissolved in this solution.

To this mixture is added the dry calcium source. The addition is controlled so that foaming caused by the neutralization product, carbon dioxide is controlled. At this point the syrup is very viscous. Continued heating may be necessary. When calcium hydroxide is used, the neutralization process is an exothermic reaction therefore the amount of heating used can be reduced. The addition is controlled so that reaction mixture does not exceed 120° F.

The sweetener supplement compositions are generally shelf-stable due to their low water activity. However, the compositions can be pasteurized with a short time, high temperature treatment or otherwise sterilized as is conventional for products of this type.

Premix 2: Beverage Flavor Base and Method of Preparation

The beverage flavor base compositions have a concentration of greater than about 50-fold to about 100-fold. The pH for the beverage flavor base compositions is less than or equal to about 3.5.

The beverage flavor base compositions of the present invention generally have a concentration of from about 10-fold to about 500-fold, preferably 50-fold to about 100-fold, and preferably comprise:

(a) an effective amount of a flavor component;
(b) from about 3% to about 25% of an acid component comprising of a mixture of citric and malic acid wherein the weight ratio of citric acid to malic acid is from about 20:80 to about 35:65;
(c) from about 8% to about 50% sucrose; and
(d) from about 20% to about 40% water;

wherein said flavor base preferably provides from about 3% to about 12% juice by volume when diluted to a single strength beverage. These beverage flavor base compositions, when combined with a calcium fortified sweetener containing about 1.5% to about 7% soluble calcium form beverage premix concentrates that are stable from calcium precipitation at temperatures of at least about 90° F. (32° C.) for at least about 3 days.

The more preferred beverage flavor base compositions of the present invention have a concentration of greater than 50-fold typically from about 50 fold to about 70 fold, and comprise;

(a) an effective amount of flavor component;
    (b) from about 3% to about 10.5%, by weight, of an acid component comprising a mixture of citric acid and malic acid wherein the weight ratio of citric acid to malic is from about 20:80 to about 30:70;
    (c) from about 8% to about 50%, on a dry weight basis, sucrose;
    (d) from about 20% to about 40% water.

wherein said beverage flavor base provides from about 3% to about 12% preferably from about 8% to about 12%, juice by volume when diluted to a single strength beverage. These more preferred beverage flavor base compositions when combined with a calcium fortified sweetener containing from about 2.5% to about 3.5% soluble calcium form beverage premix concentrates that are stable from calcium precipitation at temperatures of at least about 90° F. (32° C.) for at least about 7 days, preferably at least about 28 days.

The beverage flavor base is made from:
1. Flavor component;
2. Optional ingredients: Gums thickeners, colors, preservatives etc;
3. Dry, e.g., powdered, citric acid and malic acid; and
4. Water.

Preferably the optional ingredients, e.g., gums, colors and preservatives, are premixed and dissolved in liquid media, preferably water.

The flavor component is analyzed using standard methods in the art for the citric and malic acid content, sugar content and water content. The flavor component preferably comprises fruit and or botanical concentrates and/or purees such that when the beverage premix concentrates and syrups are diluted to a single strength beverage they contain from about 3 to about 12 %, more preferably from about 8% to about 12% juice by volume. For example, a 50× beverage premix concentrate composition, formulated to provide from about 8% to about 12% juice by volume on a single strength basis will be combined with from about 10% to about 14% sugar, and from 0% to about 2% optional. ingredients to form a syrup to make the base which is then diluted with 6 parts water by volume to achieve a single strength beverage. Such a 50× beverage flavor base composition will comprise from about 70% to about 80%, by weight, fruit and/or botanical concentrates and/or purees. The premix solutions is pumped to a mix tank where fruit and/or botanical concentrates, purees, acids, sugar and flavors are added to form the flavor base concentrate. The solution is analyzed for citric and malic acid content, water content and sugar content. Adjustments are made if needed.

Preferably, in preparing the beverage flavor base one must determine the following things:
1. The amount of calcium wanted in the finished beverage premix concentrate. This determines the amount of acid that can be present in both the calcium fortified sugar syrup and flavor base.
2. The amount of solids wanted in the flavor base to obtain needed solids to water level in finished beverage premix concentrate.
3. The amount and ratio of citric and malic acid wanted in the flavor base to obtain needed solids to water level in finished beverage premix concentrate.
4. The final volume of flavor base wanted. (The amount must be fixed to determine ratio etc.)
5. The amount of citric and malic acid in the flavor component (juice concentrate, purees, etc.).

The desired solids (°Brix), weight % acid, and volume (gal) of the base is determined. A °Brix measurement is taken to determine the amount of solids present in the flavor component, e.g., purees, i.e. flavor, etc. The amount of solids needed is then determined.

Determine the weight of additional solids needed from sucrose tables which convert °Brix to pds/gal of sucrose.

°Brix (solids)=(corresponding density from sucrose table)

°Brix (solids) desired: (corresponding density from sucrose table)

The amount of solids to add is calculated by the following formula:

$$\text{Solids wanted} = (\text{volume of base desired})(\text{density of existing °Brix})(\% \text{ solid}) - \text{existing solid} = (\text{existing volume})(\text{density of existing Brix})(\% \text{ existing solids})$$

The amount of citric and malic acid present in the flavor component is measured and their ratio determined. The total amount of desired acids is then multiplied by the respective weight ratios of citric:malic to determine how much of each acid is needed. The existing amounts are subtracted from the amount of citric and malic acids needed.

Acid wanted=(volume of base desired) (density of existing °Brix) (% acid)−existing acid=(existing volume) (density of existing °Brix) (% existing acid).

Determine the amount of sugar solids to be added by subtracting added acid solids from total solids to add. If fruit juice concentrate is used as the flavorant, this will determine the amount of concentrate needed.

Concentrate to add: the weight % of acid is subtracted from °Brix of concentrate to determine the existing sugar solids. therefore:

°Brix of concentrate−weight % acid=sugar solids in concentrate.

Sugar solids needed/% existing sugar solids=Weight of concentrate to add.

Weight of concentrate to add/corresponding density at the concentrate's °Brix=gallons of concentrate to add.

After the above calculations are made, the volume of added acid is determined by the following equation, this determines the amount of water to add to the flavor base:

$$\text{volume displaced by added acid} = (\text{Weight of acid to be added})(0.0728).$$

The amount of water to add is determined as follows:

$$\text{Water to add} = \text{Desired volume} - \text{Current volume} + \text{volume of concentrate to add} + \text{volume of dry acid}.$$

The amount of acid to add is calculated as follows:

When determining the weight % acid wanted in the final formula, one must also consider the acid coming from the calcium fortified sugar syrup. Therefore, the weight % acid in the flavor component is the total acid desired—the amount of acid contributed by the CCM syrup.

To make the beverage concentrates of the present invention the two premixes are added. The amount of each premix depends on 2 things. It depends how much calcium is contained in the calcium fortified sugar syrup and how much is desired in the finished beverage. Also, the amount of each one depends on the percent juice in the base and how much is desired for the finished beverage. The premixes are blended well. Preferably for stability from calcium salt precipitation over time and/or at high temperatures, and for stability from crystallization of sugars, the weight ratio of citric acid to malic acid in premix 1 is equivalent to the weight ratio of citric acid to malic acid in premix 2. Also for optional stability premix 1 comprises greater than about 50% excess acid equivalents from citric and malic acids and/or premix 1 and premix 2 have equivalent fructose to water and/or solids to water weight ratios. Further, it is preferred that the premixes be added together within approximately 3 days for preferred calcium stability in the beverage concentration.

However, premix 1 and premix 2 are stable from calcium precipitation over time and at high temperatures as well as stable from sugar crystallization over time and at high temperatures for at least about 4 hours, preferably at least about 3 days and most preferably for at least about 7 days. Whereas the most preferred compositions of premix 1 are stable from calcium salt precipitation over time and at high temperatures, as well as stable from sugar crystallization over time and at high temperatures, for at least about 28 days.

The completed premix beverage concentrates will require water and sugar for dilution to a beverage syrup or to a single strength beverage. The determination of the appropriate amount of water and sweetener, preferably sucrose and/or fructose, to be added is within the skill of one versed in the art. Further, although it is preferred for a 50× premix concentrate or flavor base, for example, to be diluted with sugar and water to form a syrup then diluted with about 6 parts water by volume, it is not required since the Brix i.e. sweetness, tartness of a single strength beverage is often dictated by consumer taste differences.

In summary, this is a process for preparing a shelf-stable beverage premix concentrate or beverage syrup, comprising the steps of:
1. preparing a calcium fortified sugar syrup, premix 1, by a process comprising the steps of:
   (1) preparing a solution of sugar and water,
   (2) preparing a solution of citric and malic acids by dissolving said acids in water;
   (3) combining the sugar solution of (1) with the citric and malic acids of (2) with agitation;
   (4) adding with agitation a slurry of calcium salts in water while maintaining the temperature below 120° F. until the neutralization reaction is complete and a clear solution is achieved; and
2. preparing a beverage flavor base, premix 2, by a process comprising a flavor component, water, citric acid and malic acid; wherein the weight ratio of citric acid and malic acid in premix 2 is in the same ratio as the citric and malic acids in premix 1 and the weight ratio of sugars (on a dry weight basis) to water in premix 2 is the same as in premix 1 and the weight ratio of sugars (on a dry weight basis) to water in premix 1 and premix 2 are preferably in the range of from about 1:5 to about 3:1 preferably from about 1:1 to about 2:1, more preferably from about 1.5:1 to about 2:1 and most preferably about 2:1;
Instead of preparing a sugar solution from dry sugar, sugar syrups such as high fructose corn syrup and liquid fructose can be used. If an acidic anion source is used it can either be added and dissolved into the citric and malic acid solution of premix 1 or dissolved in water and then the calcium sources added to form the calcium slurry of premix 1. Optional components such as preservatives can be dissolved in water and added with agitation to premix 1, premix 2 or the combined composition.
3. combining premix 1 and premix 2;

EXAMPLES

The following are specific embodiments of beverage premix concentrates of the present invention and methods for making them. These examples are illustrative of the invention and are not to be limiting of it.

A beverage premix concentrate of the present invention is prepared as follows:

Example 1

| Premix 1 | |
|---|---|
| Ingredients | wt/wt % |
| Water | 5.52 |
| Citric and Malic Acid | 38.90 |
| Liquid Fructose | 35.65 |
| $CaCl_2.2H_2O$ | 7.70 |
| $CaCO_3$ | 12.23 |
| | 100.00 |

1. Liquid fructose supplied by A. E. Staley having 77% solids and 23% water wherein 99% of the solids is fructose.

The citric and malic acids are dissolved in 100% of the water and liquid fructose. Heating slightly while mixing and maintaining the temperature below about 100° F. (38° C.). $CaCl_2.2H_2O$ is then dissolved in the solution. $CaCO_3$ is dispersed in the liquid fructose and then added to the solution containing the acids and $CaCl_2.2H_2O$, while mixing. At this point, foaming can occur. Mix until solution becomes clear and gas has evolved.

The resulting composition comprises 1.7% soluble calcium, by weight; pH of 2.7 (measured as is); 71 °Brix and a density of 1.4 calculated as specific gravity. The premix I composition is stable for at least about 21 days at temperatures of about 85° F. (29° C.).

| Premix 2 | |
|---|---|
| Ingredients | wt/wt % |
| Fruit Concentrates | 72.43 |
| Flavors and Optional Ingredients | 8.07 |
| Water | 10.67 |
| Citric and Malic Acids | 4.55 |
| Sucrose | 4.29 |
| | 100.00 |
| Combined System | |
| Premix #1 | 76.35 |
| Premix #2 | 23.65 |
| | 100.00 |

The fruit concentrates are analyzed to determine the citric and malic acid content. The flavors and optional ingredients are first dispersed in water. The fruit juice concentrate is then added while stirring with a lightning mixer. Solid materials consisting of citric and malic acids and sugar are then added.

Premix 1 and 2 are mixed together in the proportion of 76.35% premix 1 and 23.65% premix 2. The resulting composition comprises 1.2% soluble calcium, by weight; pH of about 3.5, and a °Brix of about 67°. The beverage premix concentrate is stable from calcium precipitation for at least about 35 days at temperatures of at least about 90° F. (32° C.).

A beverage premix concentrate of the present invention is prepared as follows:

Example 2

| Premix 1 | |
|---|---|
| Ingredients | wt/wt % |
| Water | 5.52 |
| Citric and Malic Acid | 38.90 |
| Liquid Fructose | 35.65 |
| $CaCl_2.2H_2O$ | 7.70 |
| $CaCO_3$ | 12.23 |
| | 100.00 |

1. Liquid fructose supplied by A. E. Staley having 77% solids and 23% water wherein 99% of the solids is fructose.

The citric and malic acids are dissolved in 100% of the water and liquid fructose. Heating slightly while mixing and maintaining the temperature below about 100° F. (38° C.). $CaCl_2.2H_2O$ is then dissolved in the solution. $CaCO_3$ is slowly added to the solution containing the acids and $CaCl_2.2H_2O$, while mixing. At this point, foaming can occur. Mix until solution becomes clear and gas has evolved.

The resulting composition comprises 7.0% soluble calcium, by weight; pH of 2.06; 77 °Brix and a density of 1.4 calculated as specific gravity. The premix I composition is stable for at least about 4 hours at temperatures of at least about 85° F. (29° C.).

| Premix 2 | |
|---|---|
| Ingredients | wt/wt % |
| Strawberry WONF | 68.0 |
| Citric and Malic Acids | 2.0 |
| Water | 30.0 |
| | 100.00 |
| Combined System | |
| Premix #1 | 95.1 |
| Premix #2 | 4.9 |
| | 100.00 |

The strawberry WONF is analyzed to determine the acid content. Citric and malic acids are dissolved in water. The strawberry WONF is then added to the water to form premix 2. Premix 1 and 2 are mixed together in the proportion of 95.1% premix 1 and 4.9% premix 2. The resulting composition comprises 6.7% soluble calcium, by weight; pH of about 4.0, and a °Brix of about 80°. The beverage premix concentrate is stable for at least about 4 hours at temperatures of at least about 90° F. (32° C.).

What is claimed is:

1. A beverage premix concentrate stable from calcium precipitation for at least about 3 days at temperatures of at least about 85° F. (29° C.) comprising:

(a) from about 1.7% to about 3.3%, by weight, solubilized calcium;

(b) from about 8% to about 22%, by weight, of an edible acid component comprising a mixture of citric acid and malic acid wherein the ratio of citric and malic equivalents to calcium equivalents is from about 1.5:1 to about 2:1, and the ratio of citric to malic equivalents is from about 3:97 to about 93:7;

(c) from about 0.2% to about 1.7%, by weight, of an acidic anion selected from the group consisting of chloride anion, nitrate anion, sulfate anion and mixtures thereof;

(d) an effective amount of a flavor component;

(e) from about 35% to about 70%, sugar, on a dry weight basis, wherein at least about 60% of said sugar is fructose on a dry weight basis; and (f) from about 25% to about 35%, by weight, water; wherein the weight ratio of said acid component to said solubilized calcium is from about 5.5 to about 6.5; the pH is less than or equal to about 4.5.

2. A beverage premix concentrate according to claim 1 wherein the solubilized calcium is sourced from the group consisting of calcium carbonate, calcium hydroxide, calcium chloride, calcium sulfate, calcium nitrate and mixtures thereof.

3. A beverage premix concentrate according to claim 2 wherein the solubilized calcium is sourced from calcium carbonate.

4. A beverage premix concentrate according to claim 1 wherein the weight ratio of sugars (on a dry weight basis) to water is from about 1:5 to about 3:1.

5. A beverage premix concentrate stable from calcium precipitation for at least about 90° F. (32° C.) comprising:

(a) from about 1.7% to about 2.5%, by weight, solubilized calcium;

(b) from about 8% to about 16%, by weight, of an edible acid component comprising a mixture of citric acid and malic acid wherein the ratio of citric and maleic equivalents to calcium equivalents is from about 1.5:1 to about 2:1, and the ratio of citric equivalents to malic equivalents is about 20:80;

(c) from about 0.2% to about 1.3%, by weight, of an acidic anion;

(d) an effective amount of a flavor component;

(e) from about 45% to about 65%, sugar on a dry weight basis, comprising at least about 60% fructose, on a dry weight basis; and (f) from about 25% to about 35%, by weight, water; wherein the weight ratio of said edible acid component to said solubilized calcium is from about 5.5 to about 6.5; the weight ratio of sugars (on a dry weight basis) to water is from about 1:1 to about 2:1 and said beverage premix concentrate has a pH of less than or equal to 4.5.

6. A beverage premix concentrate according to claim 5 wherein the solubilized calcium is sourced from the group consisting of calcium carbonate, calcium hydroxide, calcium chloride, calcium sulfate, calcium nitrate and mixtures thereof.

7. A beverage premix concentrate according to claim 6 wherein the solubilized calcium is sourced from calcium carbonate.

8. A beverage premix concentrate according to claim 6 wherein the weight ratio of sugars to water is from about 1.5:1 to about 2:1.

9. A beverage premix concentrate according to claim 8 wherein the weight ratio of sugars to water is about 2:1.

* * * * *